United States Patent [19]

Yamanishi

[11] Patent Number: 5,608,544
[45] Date of Patent: Mar. 4, 1997

[54] FRAMED-AREA DEFINING RECTANGLE FORMING DEVICE

[75] Inventor: Eiichi Yamanishi, Yokohama, Japan

[73] Assignee: Kabushiki Kaisha Toshiba, Kanagawa, Japan

[21] Appl. No.: 453,627

[22] Filed: May 30, 1995

[30] Foreign Application Priority Data

Jun. 28, 1994 [JP] Japan ............................ 6-146651

[51] Int. Cl.$^6$ ........................... H04N 1/387; H04N 1/40; G06K 9/20
[52] U.S. Cl. ........................ 358/453; 358/448; 382/282; 382/283; 382/287
[58] Field of Search ........................ 358/453, 448; 382/282, 283, 287

[56] References Cited

U.S. PATENT DOCUMENTS 5,123,062  6/1992  Sangu ........................ 382/282
5,140,440  8/1992  Sasaki ........................ 358/453

FOREIGN PATENT DOCUMENTS 3-17787  1/1991  Japan .

*Primary Examiner*—Edward L. Coles, Sr.
*Assistant Examiner*—Tia M. Harris
*Attorney, Agent, or Firm*—Limbach & Limbach LLP

[57] ABSTRACT

In an image forming device recognizing a specified area as a rectangular shape in an original image in which the area is specified by a frame indicated by use of a marker pen or the like, erroneous detection of a rectangular shape due to noise is prevented. Pixels having the halftone value in the image data are recognized as a frame and an area surrounded by the frame is defined by a rectangle and rectangle information thereof is provided. The size of the rectangle indicated by the rectangle information is determined, and if the size of the rectangle is smaller than a preset value, the rectangle information is eliminated as invalid information.

12 Claims, 6 Drawing Sheets

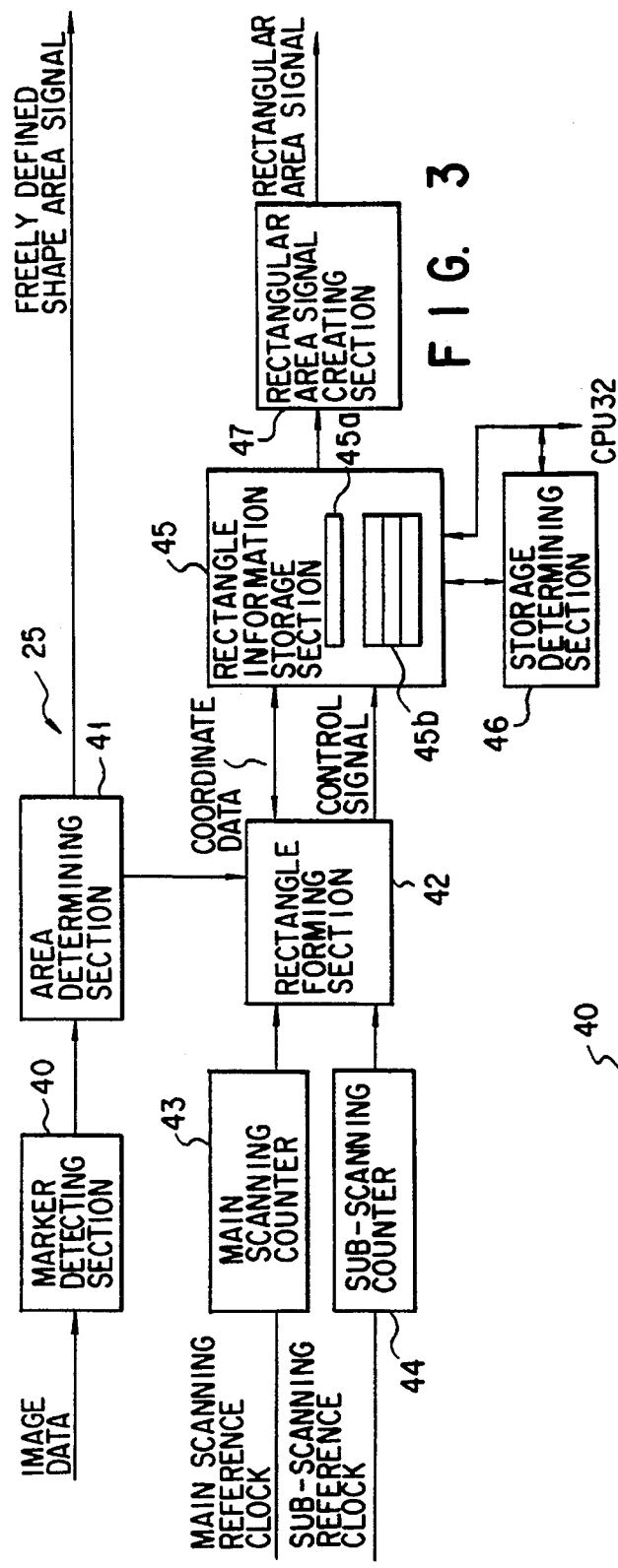
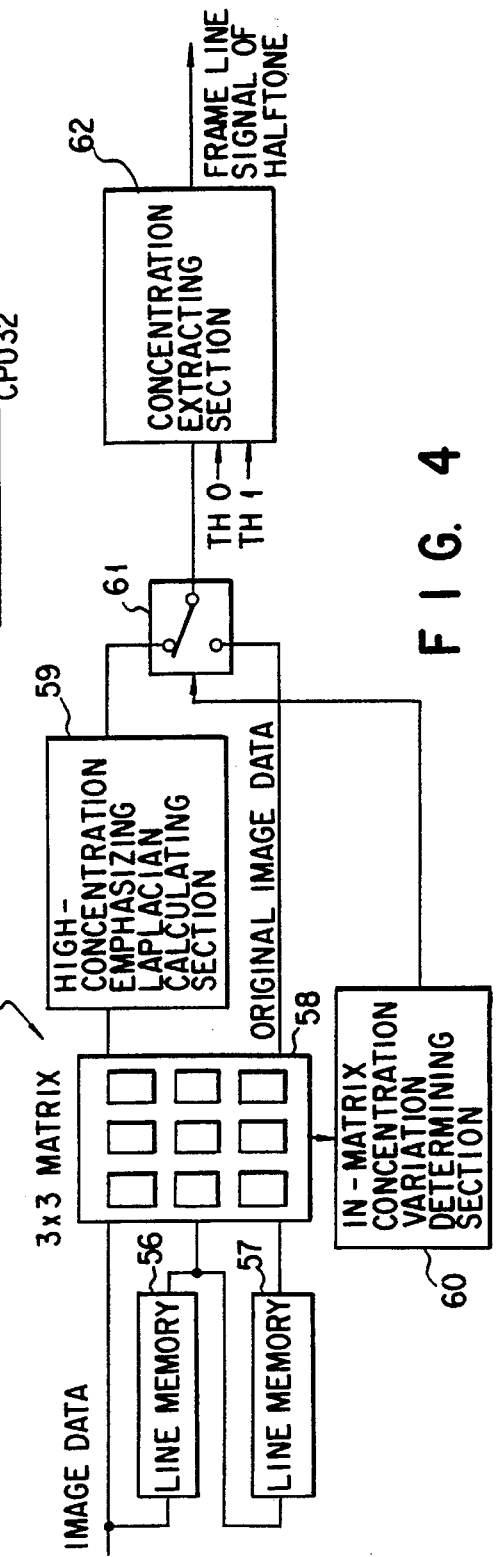

| a | b | c |
|---|---|---|
| d | e | f |
| g | h | i |
F I G. 5A
| 0 | -1 | 0 |
|---|---|---|
| -1 | 5 | -1 |
| 0 | -1 | 0 |
F I G. 5B
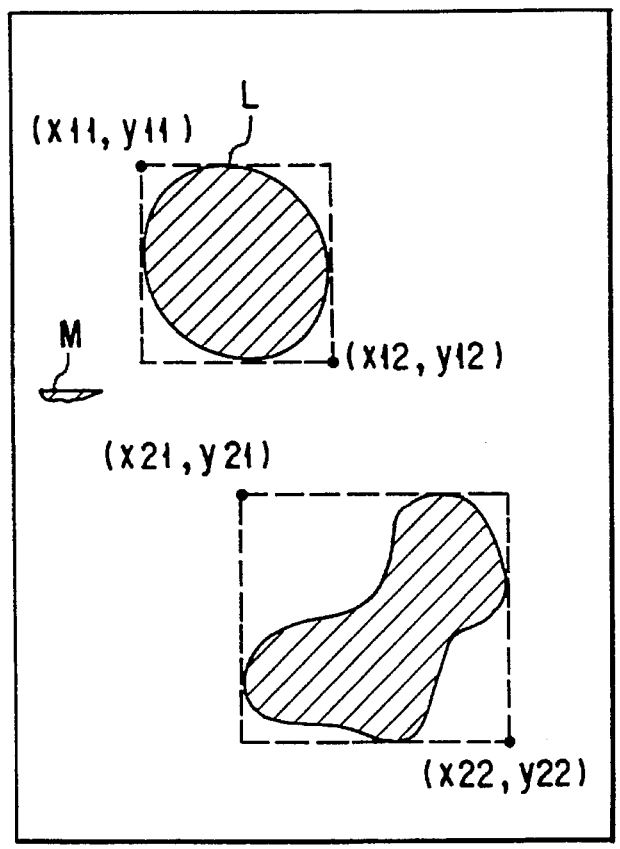
F I G. 7

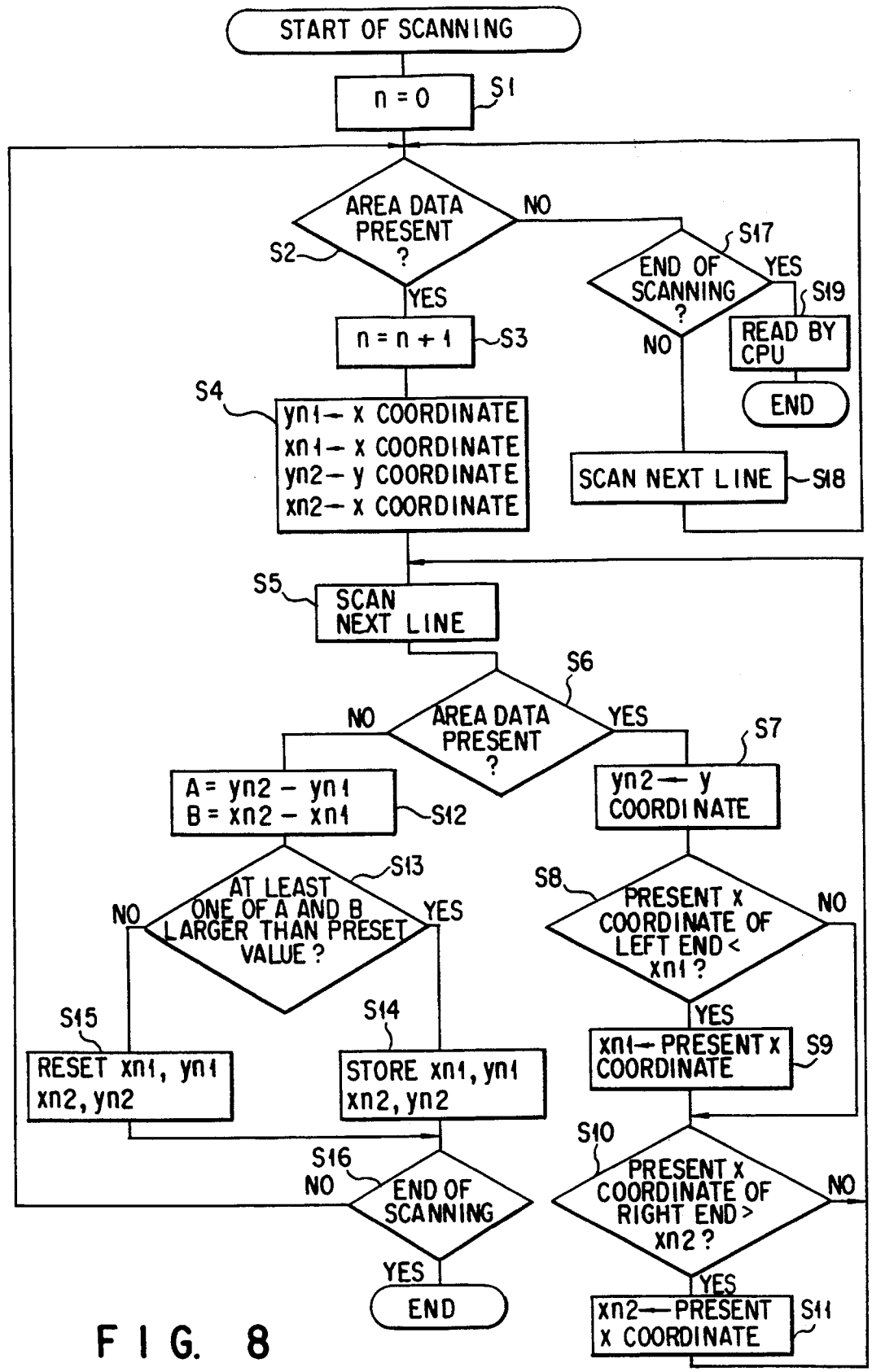
F I G. 8

FRAMED-AREA DEFINING RECTANGLE FORMING DEVICE

BACKGROUND OF THE INVENTION

1. Field of the Invention

This invention relates to an image forming device such as a copying machine, and more particularly to a framed-area defining rectangle forming device for forming a frame surrounding a specified area into a rectangular shape in an original image in which the area is specified by the frame of halftone or color indicated by use of a marker pen or the like and providing rectangle information.

2. Description of the Related Art

In some devices such as DPPC for reading and processing an image in a digital form, an area specified in a freely defined shape by use of a marker pen (or felt pen) on the original can be recognized. When the specified area is processed as an area of freely defined shape, no problem occurs in the real-time simple edition which does not use a page memory or the like, but the process becomes complicated in the edition such as rotation or movement using a page memory or the like. Therefore, as is disclosed in Jpn. Pat. Appln. KOKAI Publication No. 3-17787, a method of recognizing a frame of freely defined shape indicated by use of a marker pen and fetching the recognized area as rectangle information is proposed and put into practice. In the case of this device, an area surrounded by the frame is detected, the detected area is determined as a framed area and formed into a rectangular shape, and various rectangular application editions such as centering, cornering and framing are effected.

Various methods of holding the rectangle information can be considered, but in any case, the coordinate values of two points in the x-axis and y-axis directions are necessary for each rectangle information item and a register used for automatically storing the coordinate values is necessary. Since the register is required to have a large capacity for each rectangle, the number of registers used is limited. When an area surrounded by a marker is formed into a rectangular shape as described before and if a noise component is introduced into the rectangle forming circuit, the noise portion is also treated as part of a rectangular area and it becomes impossible to obtain information of the rectangular area which is originally necessary.

SUMMARY OF THE INVENTION

Accordingly, an object of this invention is to prevent the erroneous detection of a rectangular shape due to noise in an image forming device which recognizes a specified area as rectangle information in an original image in which the area is specified by a frame indicated by use of a marker pen or the like.

In order to achieve the above object, according to the present invention, there is provided an image area identifying device comprising reading means for reading an original image and creating image data corresponding to the original image; detection means for detecting frame line information indicating a specified area based on the image data; determination means for determining the size of the specified area according to the frame line information detected by the detection means; elimination means for eliminating the frame line information as invalid information when the size of the specified area determined by the determination means is smaller than a preset value; and means for separating image data contained in the specified area from image data in the remaining area when the size of the specified area determined by the determination means is not smaller than a preset value.

The rectangle information representing an area surrounded by a halftone frame in the image data is generated, and the size of the rectangular is determined. If the size is less than a predetermined value, the rectangle information is eliminated as invalid information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a block diagram showing a rectangle information creating section according to this invention;

FIG. 4 is a block diagram showing the construction of a marker detecting section;

FIG. 5A shows a 3×3 matrix used in the high-concentration emphasizing Laplacian calculation and FIG. 5B shows a Laplacian filter coefficient;

FIG. 7 is a conceptional diagram showing a process of creation of rectangle information; and FIG. 8 is a flowchart for illustrating the operation of a second embodiment of the rectangle information creating section according-to this invention.

DETAILED DESCRIPTION OF THE PREFERRED EMBODIMENTS

There will now be described an embodiment of this invention with reference to the accompanying drawings.

Figure 1:
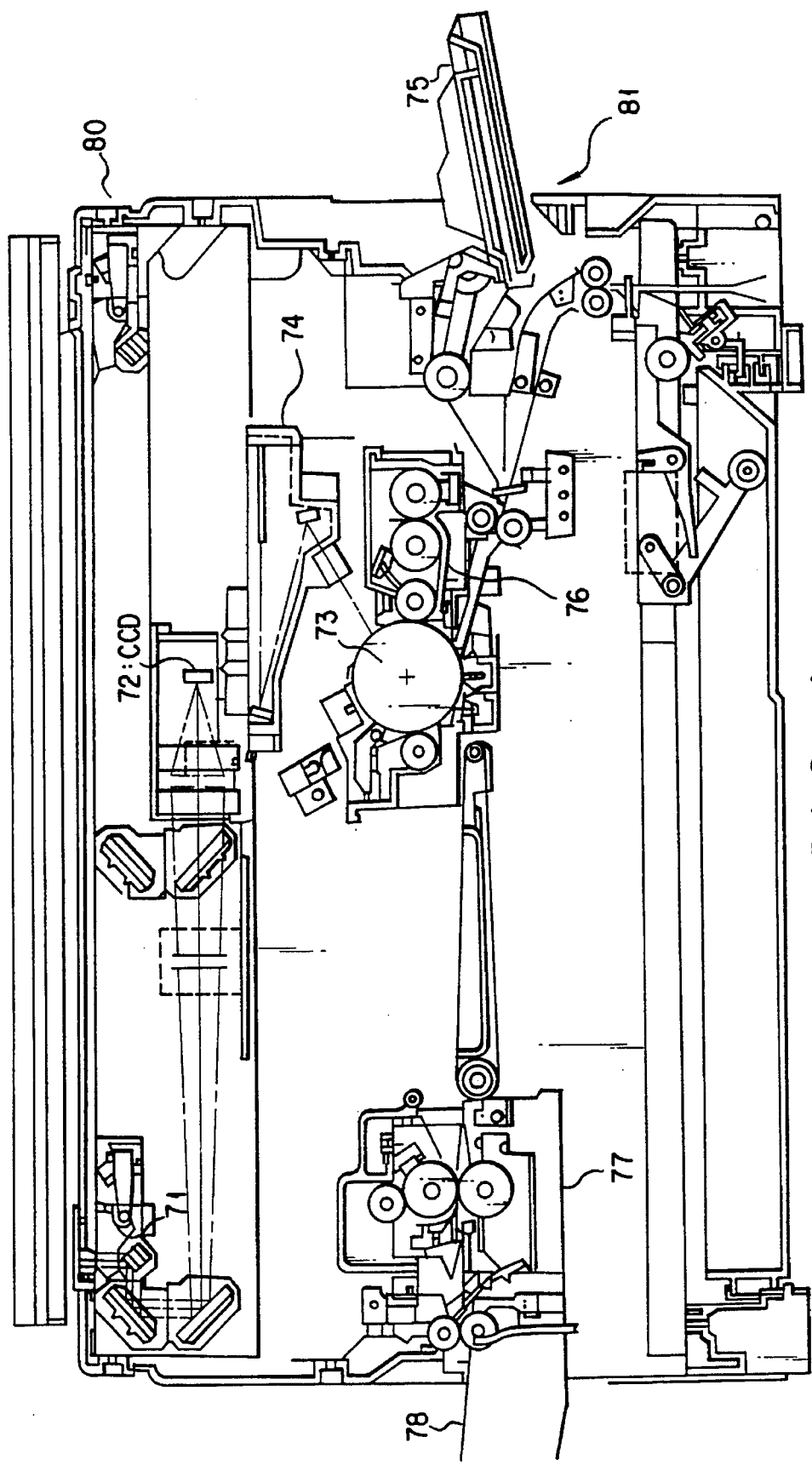
FIG. 1 is a cross sectional view showing the structure of an image forming device according to this invention.

FIG. 1 shows the structure of an image forming device having a framed-area defining rectangle forming device according to this invention. The image forming device includes a scanner 80 for reading an original to generate image data corresponding to the original image and an image forming section 81 for printing image data. The scanner 80 optically scans the original by applying light to the original by use of a light source 71 and directing the light reflected from the original to a CCD 72. An analog signal output from the CCD 72 is subjected to the A/D conversion and processed as a digital signal.

The image forming section 81 includes a laser optical system 74, photosensitive body 73, developer 76, fixing unit 77, paper supply tray 75, and paper discharging tray 78. A semiconductor laser provided in the laser optical system 74 is activated or deactivated by an image signal and emits a laser beam according to the image signal. The laser beam is reflected and scanned by a polygon mirror rotated by a polygon motor to form an electrostatic latent image on the photo-sensitive body 73. After the electrostatic latent image is developed by the developer 76, it is transferred on the paper supplied from the paper supply tray 75, fixed by the fixing unit 77 and then discharged onto the paper discharging tray 78.

Figure 2:
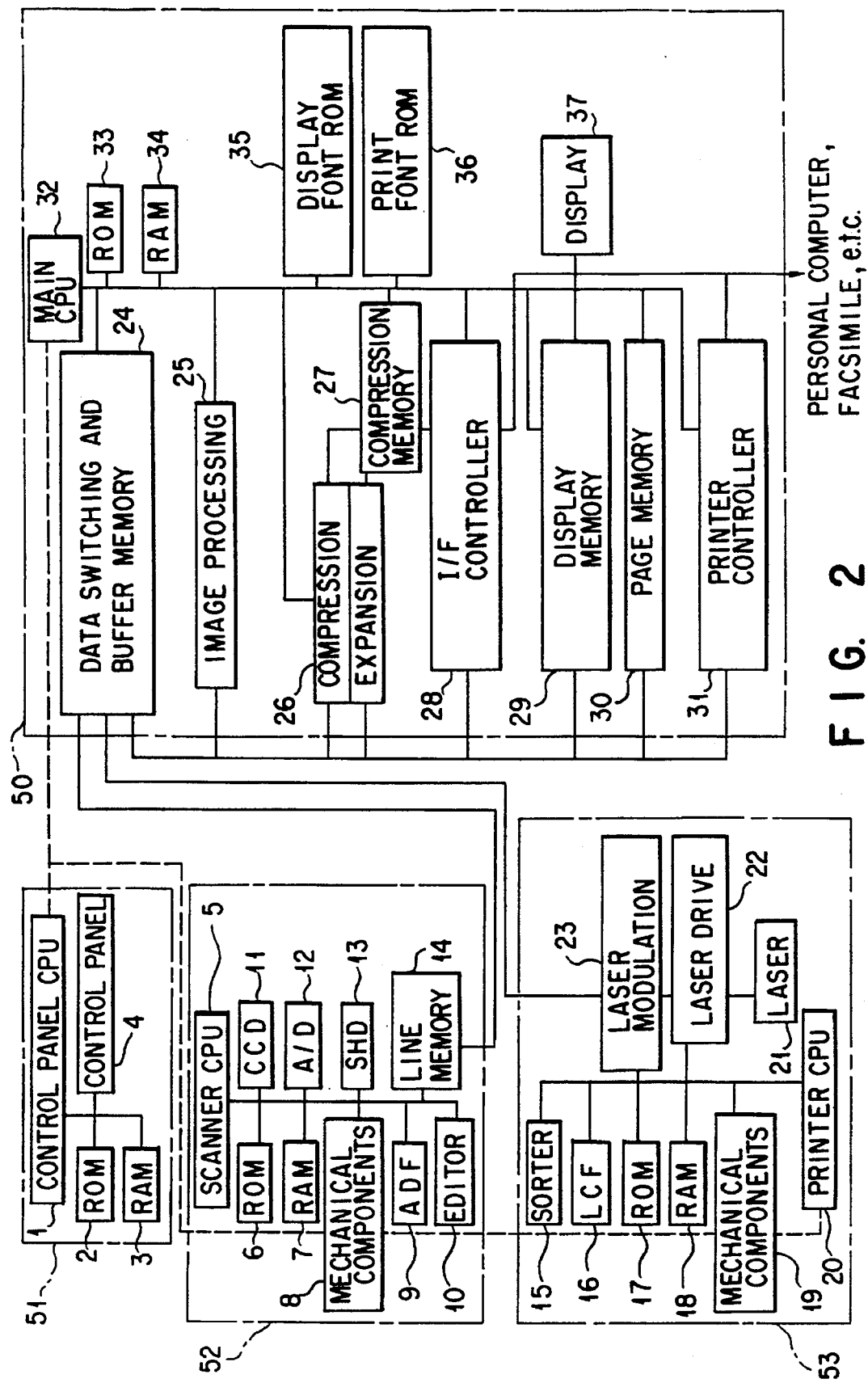
FIG. 2 is a block diagram showing the control system of the image forming device according to this invention.

FIG. 2 is a block diagram showing the control system of the image forming device shown in FIG. 1. The control system includes a basic processing section 50 controlled by a main CPU 32, a control panel section 51 controlled by a control panel CPU 1, a scanner section 10 52 controlled by a scanner CPU 5, and a printer engine section 53 controlled by a printer CPU 20. The main CPU 32 communicates with the control panel CPU 1, scanner CPU 5, and printer CPU 20 to control the CPUs.

The control panel CPU 1 is connected to a ROM 2 and RAM 3 to detect the ON/OFF state of a switch on a control panel 4, turn an LED ON or OFF, and control a liquid crystal display according to data stored in the above memories.

The scanner CPU 5 is controlled by communication with the main CPU 32 so as to control an ADF (automatic document feeder) 9, editor (coordinate inputting unit) 10, A/D (analog/digital converting circuit) 12, SHD (shading correction circuit) 13, line memory circuit 14, and mechanical components 8 such as a motor and a solenoid according to data stored in a ROM 6 and RAM 7.

The printer CPU 20 is controlled by communication with the main CPU 32 so as to control a sorter 15, LCF (large cassette feeder) 16, laser modulation circuit 23, laser drive circuit 22, and mechanical components 19 for a motor, solenoid and switch, for example.

The main CPU 32 is connected to a ROM 33, RAM 34, data switching and buffer memory circuit 24, image processing circuit 25, compression/expansion circuit 26, page memory circuit 30, display memory circuit 29, printer controller circuit 31, display font ROM 35, print font ROM 30, compression memory 27, and I/F controller circuit 28 via an internal bus. The ROM 33 stores a control program executed by the main CPU 32 and the RAM 34 provides a work area for the CPU 32. The data switching and buffer memory circuit 24 effects the switching and buffering processes to determine a destination to which data read by the scanner is to be transferred and determine data which is to be supplied to the printer engine. The image processing circuit 25 effects various processes including creation of rectangle information according to this invention based on image data. The compression/expansion circuit 26 compresses or expands image data and the page memory circuit 30 stores image data in the unit of page. The display memory circuit 29 stores data to be displayed on the display 37 and the printer controller circuit 31 converts code data from a personal computer, for example, into printer image data. The display font ROM 35 stores fonts to be displayed on the display 37 and the print font ROM 30 stores printing fonts. The compression memory 27 stores data compressed by the compression/expansion circuit 26 and the I/F controller circuit 28 provides an interface with a personal computer or facsimile.

FIG. 3 shows a framed-area defining rectangle forming section according to this invention. The framed-area defining rectangle forming section is contained in the image processing section 25 and receives image data from the scanner 52 to create rectangle information. The processing section includes a marker detecting section 40, area determining section 41, rectangle forming section 42, main scanning counter 43, sub-scanning counter 44, rectangle information storing section 45, storage determining section 46 and rectangular area signal creating section 47.

The marker detecting section 40 detects a frame line indicated by a marker pen or the like in an original image, that is, pixels having a preset information value. In this embodiment, as an example of the preset information value, a halftone value is used. The area determining section 41 is connected to the marker detecting section 40 to determine an area surrounded by a frame line detected by the marker detecting section 40. The rectangle forming section 42 is connected to the area determining section 41, forms a rectangular shape corresponding to a framed area determined by the area determining section 41, and outputs the coordinate values of the rectangle to the rectangle information storing section 45. Each of the main scanning counter 43 and sub-scanning counter 44 is constructed by a 13-bit counter to indicate coordinate values of image data in the area output from the area determining section 41. The storage determining section 46 is connected to the rectangle information storing section 45 to determine the size of a rectangle formed by the rectangle forming section 42, identifies only the rectangle equal to or larger than a preset size and stores the rectangle into a register 45b of the rectangle information storing section 45. The rectangular area signal creating section 47 outputs a rectangular area signal according to information set by the CPU, for example.

Next, the operation of one embodiment of the image forming device including the framed-area defining rectangle forming section of this invention with the above construction is explained in detail. First, if an original is placed on an original table and the copying operation is specified via the control panel section 51, analog image data read by the CCD sensor 72 is converted into multivalued image data by the A/D converting circuit 12. The multivalued image data is subjected to the shading correction process by the SHD circuit 13 and is then transferred to the framed-area defining rectangle forming section in the image processing circuit 25 via the data switching and buffer memory 24 while transfer timings are adjusted by use of the line memory 14. Pixels having the halftone value are detected from the image data input to the framed-area defining rectangle forming section by the marker detecting section 40.

FIG. 4 is a block diagram showing the detail construction of the marker detecting section 40. The marker detecting section selectively uses a high-concentration emphasizing filter to process the image data and prevent storage of false rectangle information due to noise occurring at the time of formation of the rectangle. Generally, when the pixel of halftone indicated by a marker pen or the like is detected, pixels of halftone will be formed in the boundary portion between the ground of the original and the character image in the multivalued image data read even if a variation in the concentration of a character image in the image data is significant. The high-concentration emphasizing filter is provided to eliminate the pixels of halftone. However, if the high-concentration emphasizing filter is applied to the halftone pixel area (frame image) indicated by use of the marker pen, the boundary area between the frame line and the ground is emphasized, the concentration of the boundary area becomes higher than that of the central portion in the width direction of the frame line and the boundary area may be determined as a character area in some cases. Therefore, the marker detecting section 40 uses the high-concentration emphasizing filter only for an image such as a character having a significant variation in the concentration as will be described later.

First, multivalued image data from the scanner 52 is output to a 3×3 matrix section 58 and line memory 56. The line memory 56 is constructed by a shift register to hold data of one line, for example, and output data to a line memory 57 and the 3×3 matrix section 58 at the time when next line data is input. As is clearly seen from FIG. 4, in this embodiment, data of three lines in the sub-scanning direction can be referred to by use of the line memory of two lines. In the 3×3 matrix section 58, data of three lines in the sub-scanning direction and three dots in the main scanning direction, that is, data of nine dots in total is held for a period of one cycle of the image transferring clock and updated data is held in the next clock period.

In the high-concentration emphasizing Laplacian calculating section 59, the following calculation is effected by using data of the 3×3 matrix section 58 as a value shown in FIG. 5A and using the Laplacian filter coefficient as a value shown in FIG. 5B.

$$\begin{aligned} x &= 5 \times e + a \times 0 + b \times (-1) + c \times 0 + d \times (-1) + \\ &\quad f \times (-1) + g \times 0 + h \times (-1) + i \times 0 \\ &= 5e - b - d - f - h \end{aligned}$$

An in-matrix concentration variation determining section 60 refers to a variation in the concentration in the 3×3 matrix 58 to determine whether data subjected to the high-concentration emphasizing process is output to the next stage or original image data (a pixel at the matrix center) which is not subjected to the high-concentration emphasizing process is output to the next stage. An example of the in-matrix concentration variation determining section 60 is provided as follows. That is, the maximum value and minimum value in the 3×3 matrix 58 are derived and the determination is made based on a difference between the values. When Dmax is the maximum concentration in the 3×3 matrix, Dmin is the minimum concentration in the 3×3 matrix, and TH2 is a determination threshold value, then the following relation can be obtained.

Dmax−Dmin>TH2: high-concentration emphasizing data is used;

Dmax−Dmin≦TH2: original image data is used.

Thus, the in-matrix concentration variation determining section 60 determines the output data and outputs a switching signal to the switching section 61.

A concentration extracting section 62 determines whether or not input data lies in a range of given threshold values (TH0 and TH1), and if it is within the range, it outputs information indicating that a frame signal of halftone is detected to the area determining section 41 of FIG. 3.

The area determining section 41 detects an area framed by a marker by use of a method described in Jpn. Pat. Appln. KOKAI Publication No. 3-17787 which discloses the framed area determining device, for example, and outputs the result of detection as binary data to the rectangle forming section 42.

The rectangle forming section 42 determines a rectangle surrounding the area based on framed area data input from the area determining section 41. The coordinate values of two ends of the diagonal of the rectangle (the upper left corner and lower right corner of the rectangle) are output to the register 45a of the rectangle information storage section 45 by referring to the contents of the main scanning counter 43 and sub-scanning counter 44.

The storage determining section 46 according to this invention is connected to the rectangle information storage section 45, and when rectangle information stored in the register 45a is smaller than a preset value (for example, 4 mm), the rectangle information is cancelled. If the rectangle information stored in the register 45a is larger than the preset value, the content of the register 45a is transferred into the register 45b and read by the CPU 32. The above preset value is set to a small value which will not be set by the operator when the operator specifies an area and is generally smaller than the size of one character.

Figure 6:
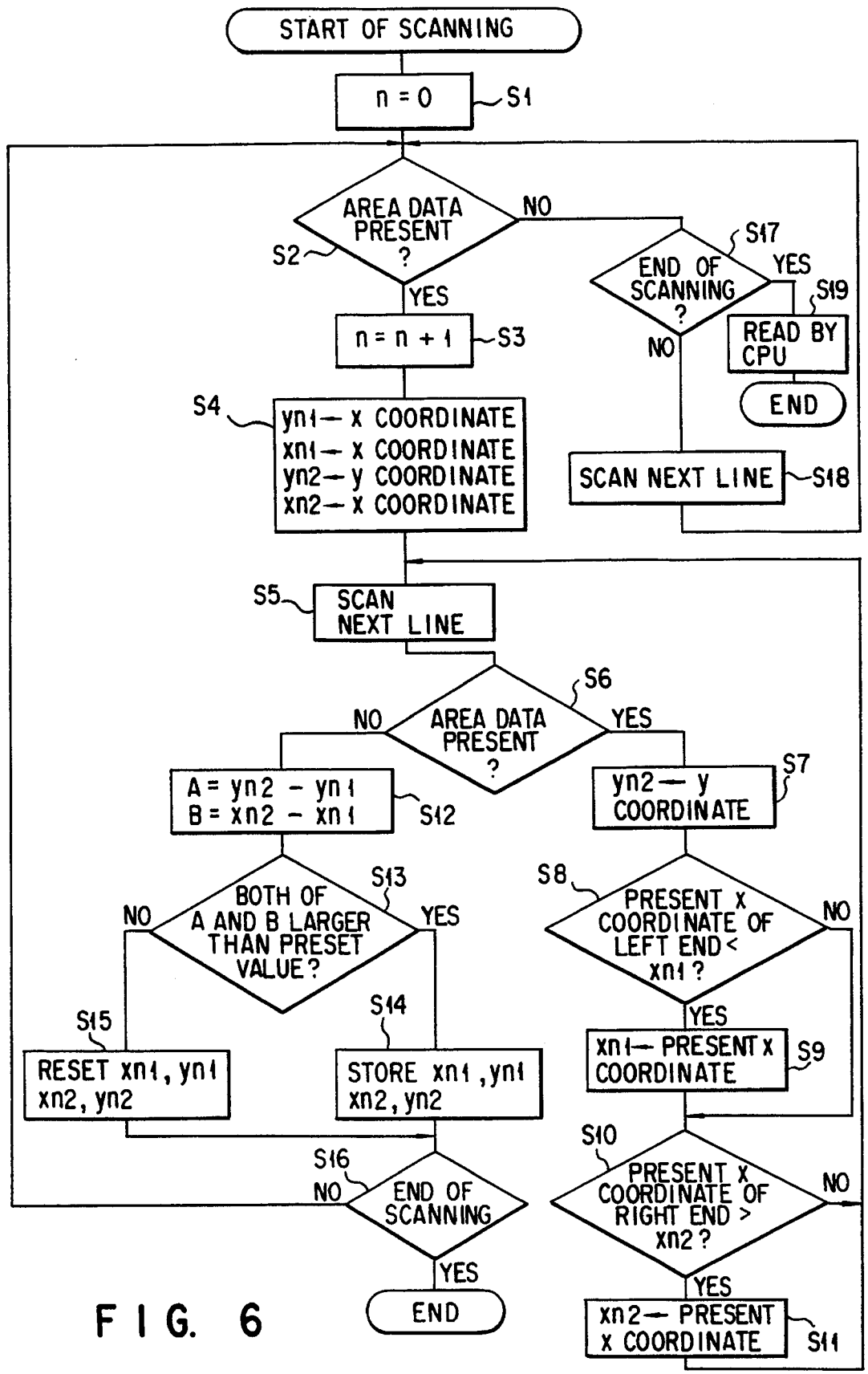
FIG. 6 is a flowchart for illustrating the operation of a first embodiment of the rectangle information creating section according to this invention.

FIG. 6 is a flowchart for illustrating the detail operation of the framed-area defining rectangle forming section according to this invention and the operation is controlled by the main CPU 32. Binary area data as shown in FIG. 7 is input to the rectangle forming section 42 from the area determining section 41. The area determining section 41 outputs framed area data scanned in the left-to-right direction (main scanning direction) in FIG. 7 and in the upper-to-lower direction (sub-scanning direction) and the coordinate values of framed-area pixels are always indicated by 13-bit data of the main scanning counter 43 (x coordinate) and sub-scanning counter 44 (y coordinate).

The rectangle forming section 42 first sets n to 0 (S1) and determines whether or not area data is present on one scanning line (S2). If no area data is present on the scanning line, termination of the scanning operation is determined (S17), and if the scanning operation is not completed, a next line is scanned (S18). If it is detected in the step S2 that area data is present, n is set to (n+1) (S3) and the present y-coordinate values of the area data are set to yn1 and yn2, the present x-coordinate values thereof are set to xn1 and xn2, and they are stored into the register 45a of the rectangle information storage section 45 (S4). In this case, as is clearly seen from FIG. 7, since the area data is constructed only by data of a point L in a case where the area data is first detected, the coordinate values of the point L will be stored into the register 45a. That is, y11=y12= present y-coordinate value, and x11=x12= present x-coordinate value.

After this, a next line is scanned (S5) and the rectangle forming section 42 determines whether or not area data is present on the scanning line (S6). If the area data is present, the present y-coordinate value is stored into the register 45a as yn2 (S7). Next, when the present x-coordinate value on the left end of the area data is smaller than xn1, xn1 is updated by the present x-coordinate value (S8, S9). Further, when the present x-coordinate value on the right end of the area data on the scanning line is larger than xn2, xn2 is updated by the present x-coordinate value (S10, S11).

If it is detected in the step 6 that no area data is present on the scanning line, the storage determining section 46 calculates the dimensions (yn2−yn1) and (xn2−xn1) of the respective sides of the rectangle and sets the respective results of calculation to A and B (S12). Next, whether or not both of A and B are larger than a preset value is determined (S13). When both of A and B are equal to or larger than the preset value, the coordinate values (xn1, yn1) and (xn2, yn2) stored in the register 45a are stored into the register 45b (S14). When at least one of A and B is smaller than the preset value, the coordinate values (xn1, yn1) and (xn2, yn2) stored in the register 45a are reset (S15). That is, they are determined as invalid (or incorrect), and are not stored into the register 45b.

Next, whether the image scanning process is completed or not is determined (S16), and if the image scanning process is not completed, the control flow returns to the step S2 and next area data is subjected to the rectangle forming process. At this time, the subscript n of x and y is incremented by 1 and set to 2, and is sequentially increased to 3, 4, with an increase in the number of rectangles. When it is detected in the step S16 that the image scanning process is completed, the content of the register 45b is transferred to the RAM 34 via the CPU 32 (S19). The rectangle information storing section 45 is also connected to the rectangular area signal creating section 47 and the rectangular area signal creating section 47 outputs rectangle information for another image processing according to derived information or information set by the CPU 32.

FIG. 7 shows rectangle data items (x11, y11), (x12, y12) and (x21, y21), (x22, y22) of the area data and a stain M smaller than the preset value is not stored in the register 45b as rectangle data.

FIG. 8 is a flowchart for illustrating the operation of a second embodiment according to this invention. The operation of the second embodiment is similar to the operation shown in FIG. 6, but the step S13 is different. That is, the step S13' in the second embodiment is to determine whether or not at least one of the dimensions A and B of the sides of the rectangle is larger than a preset value. When at least one of A and B is equal to or larger than the preset value, the coordinate values (xn1, yn1), (xn2, yn2) stored in the register 45a are stored into the register 45b (S14). When both of A and B are smaller than the preset value, the coordinate values (xn1, yn1), (xn2, yn2) stored in the register 45a are reset (S15).

As described above, according to this invention, in an image forming device for recognizing a specified area as rectangle information in an original image in which the area is specified by a frame indicated by use of a marker pen or the like, erroneous detection of a rectangle due to noise can be prevented.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An image area identifying device comprising:
   means for reading an original image to generate image data corresponding to the original image;
   means for detecting frame line information indicating a specified area from the image data;
   means for determining the size of the specified area corresponding to the frame line information detected by said detecting means;
   means for eliminating the frame line information as incorrect information when the size of the specified area determined by said determinating means is smaller than a preset value;
   means for identifying that the image data contained in the specified area is specified image data when the size of the specified area determined by said determinating means is not smaller than the preset value; and
   wherein said specified area is a rectangle and said determining means includes second determining means for determining dimensions of two adjacent sides of the rectangle, and said eliminating means includes second eliminating means for eliminating the rectangle information as incorrect information when at least one of dimensions of sides of the rectangle is smaller than a preset value.

2. An image area identifying device comprising:
   means for reading an original image to generate image data corresponding to the original image;
   means for detecting frame line information indicating a specified area from the image data;
   means for determining the size of the specified area corresponding to the frame line information detected by said detecting means;
   means for eliminating the frame line information as incorrect information when the size of the specified area determined by said determinating means is smaller than a preset value;
   means for identifying that the image data contained in the specified area is specified image data when the size of the specified area determined by said determinating means is not smaller than the preset value; and
   wherein said eliminating means includes second eliminating means for eliminating the rectangle information as incorrect information when both of dimensions of two adjacent sides of the rectangle are smaller than a preset value.

3. A framed-area defining rectangle forming device comprising:
   means for scanning an original image to generate image data corresponding to the original image;
   means for detecting pixels having frame information for specifying a particular area in the image data as a frame line;
   means for determining an area surrounded by the pixels detected by said detecting means as a framed area and providing image data in the framed area;
   coordinate display means for indicating the coordinate values of image data items in the framed area provided from said area determining means;
   rectangle forming means for forming the framed area determined by said area determining means into a rectangular shape and providing rectangle information by use of the coordinate values indicated by said coordinate display means;
   first storage means for storing rectangle information provided by said rectangle forming means;
   first determining means for determining the size of a rectangle indicated by the rectangle information stored in said first storage means;
   second storage means for storing the rectangle information stored in said first storage means as effective information when the size of the rectangle determined by said first determining means is larger than a preset value;
   means for eliminating the rectangle information stored in said first storage means as incorrect information when the size of the rectangle determined by said first determining means is not larger than the preset value; and
   wherein said first determining means includes second determining means for determining dimensions of two adjacent sides of the rectangle, and said second storage means includes third storage means for storing the rectangle information stored in said first storage means as effective information when both of the dimensions of the two adjacent sides of the rectangle are equal to or larger than a preset value.

4. A device according to claim 3, wherein said second storage means includes fourth storage means for storing the rectangle information stored in said first storage means as effective information when at least one of the dimensions of the two adjacent sides of the rectangle is equal to or larger than the preset value.

5. An image forming device for forming an image on the basis of an original image, comprising:

means for scanning the original image to generate image data corresponding to the original image;

means for detecting pixels having frame information for specifying a particular area in the image data as a frame line;

first determining means for determining an area surrounded by the pixels detected by said detecting means as a framed area and providing image data in the framed area;

means for indicating the coordinate values of image data items in the framed area provided from said first determining means;

means for forming the framed area determined by said first determining means into a rectangular shape and providing rectangle information by use of said indicating means;

first storage means for storing rectangle information provided by said rectangle forming means;

means for determining the size of a rectangle indicated by the rectangle information stored in said first storage means;

second storage means for storing the rectangle information stored in said first storage means as effective information when the size of the rectangle determined by said determining means is not smaller than a preset value;

means for eliminating the rectangle information stored in said first storage means as incorrect information when the size of the rectangle determined by said first determining means is smaller than the preset value;

means for processing the image information based on the effective rectangle information stored in said second storage means;

means for printing image information processed by said processing means; and wherein said size determining means includes means for determining dimensions of two adjacent sides of the rectangle, and said second storage means includes third storage means for storing the rectangle information stored in said first storage means as effective information when both of the dimensions of the two adjacent sides of the rectangle are equal to or larger than a preset value.

6. A device according to claim 5, wherein said second storage means includes fourth storage means for storing the rectangle information stored in said first storage means as effective information when at least one of the dimensions of the two adjacent sides of the rectangle is equal to or larger than the preset value.

7. An image area identifying device comprising;

means for reading an original image to generate image data corresponding to the original image;

means for detecting frame line information indicating a specified area from the image data;

means for circumscribing a rectangle about the specified area on the basis of the frame line information detected by said detecting means, and providing rectangle information indicating the rectangle;

means for determining dimensions of two adjacent sides of the rectangle indicated by the rectangle information provided by said circumscribing means;

means for eliminating the rectangle information, as invalid information, when at least one of the determined dimensions of the adjacent sides is smaller than a predetermined value; and means for distinguishing image data corresponding to an image included in the specified area from image data corresponding to an image included in the other area, when both the determined dimensions of the adjacent sides are equal to or greater than the predetermined value.

8. An image area identifying device comprising:

means for reading an original image to generate image data corresponding to the original image;

means for detecting frame line information indicating a specified area from the image data;

means for circumscribing a rectangle about the specified area on the basis of the frame line information detected by said detecting means, and providing rectangle information indicating the rectangle;

means for determining dimensions of two adjacent sides of the rectangle indicated by the rectangle information provided by said circumscribing means;

means for eliminating the rectangle information, as invalid information, when both the determined dimensions of the adjacent sides are smaller than a predetermined value; and means for distinguishing image data corresponding to an image included in the specified area from image data corresponding to an image included in the other area, when at least one of the dimensions of the adjacent sides is equal to or greater than the predetermined value.

9. A framed-area defining rectangle forming device comprising:

scanning means for scanning an original image to generate image data corresponding to the original image;

detecting means for detecting pixels having frame information for specifying a particular area in the image data, as a frame line;

framed area-determining means for determining an area surrounded by the pixels detected by said detecting means, as a framed area, and providing image data corresponding to an image including the framed area;

indicating means for indicating coordinate values of the image data provided by said framed area-determining means;

circumscribing means for circumscribing a rectangle about the framed area, and providing rectangle information, which indicates the rectangle, by use of the coordinate values indicated by said indicating means;

first storage means for storing the rectangle information provided by said circumscribing means;

determining means for determining dimensions of two adjacent sides of the rectangle indicated by the rectangle information stored by said first storage means;

second storage means for storing the rectangle information stored by said first storage means, as valid information, when both the determined dimensions of the adjacent sides are equal to or greater than a predetermined value; and eliminating means for eliminating the rectangle information stored by the first storage means, as invalid information, when at least one of the dimensions of the adjacent sides is smaller than the predetermined value.

10. A framed-area defining rectangle forming device comprising;

scanning means for scanning an original image to generate image data corresponding to the original image;

detecting means for detecting pixels having frame information for specifying a particular area in the image data, as a frame line;

framed area-determining means for determining an area surrounded by the pixels detected by said detecting means, as a framed area, and providing image data corresponding to an image included in the framed area;

indicating means for indicating coordinate values of the image data provided by said framed area-determining means;

circumscribing means for circumscribing a rectangle about the framed area, and providing rectangle information, which indicates the rectangle, by use of the coordinate values indicated by said indicating means;

first storage means for storing the rectangle information provided by said circumscribing means;

determining means for determining dimensions of two adjacent sides of the rectangle indicated by the rectangle information stored by said first storage means;

second storage means for storing the rectangle information stored by said first storage means, as valid information, when at least one of the determined dimensions of the adjacent sides is equal to or greater than a predetermined value; and eliminating means for eliminating the rectangle information stored by said first storage means, as invalid information, when both the dimensions of the adjacent sides are smaller than the predetermined value.

11. An image forming device for forming an image on the basis of an original image, comprising;

scanning means for scanning the original image to generate an image data corresponding to the original image;

detecting means for detecting pixels having frame information for specifying a particular area in the image data, as a frame line;

framed area-determining means for determining an area surrounded by the pixels detected by said detecting means, as a framed area, and providing image data corresponding to an image included in the framed area;

indicating means for indicating coordinate values of the image data provided by said framed area-determining means;

circumscribing means for circumscribing a rectangle about the framed area, and providing rectangle information, which indicates the rectangle, by use of the coordinate values indicated by said indicating means;

first storage means for storing the rectangle information provided by said circumscribing means;

determining means for determining dimensions of two adjacent sides of the rectangle indicated by the rectangle information stored by said first storage means;

second storage means for storing the rectangle information stored by said first storage means, as valid information, when both the determined dimensions of the adjacent sides are equal to or greater than a predetermined value;

eliminating means for eliminating the rectangle information stored by said first storage means, as invalid information, when at least one of the dimensions of the adjacent sides is smaller than the predetermined value;

processing means for processing the image data generated by said scanning means on the basis of the rectangle information stored as valid information by said second storage means; and printing means for printing the image data processed by said processing means.

12. An image forming device for forming an image on the basis of an original image, comprising:

scanning means for scanning the original image to generate image data corresponding to the original image;

detecting means for detecting pixels having frame information for specifying a particular area in the image data, as a frame line;

framed area-determining means for determining an area surrounded by the pixels detected by said detecting means, as a framed area, and providing image data corresponding to an image included in the framed area;

indicating means for indicating coordinate values of the image data provided by said framed area-determining means;

circumscribing means for circumscribing a rectangle about the framed area, and providing rectangle information, which indicates the rectangle, by use of the coordinate values indicated by said indicating means;

first storage means for storing the rectangle information provided by said circumscribing means;

determining means for determining dimensions of two adjacent sides of the rectangle indicated by the rectangle information stored by said first storage means;

second storage means for storing the rectangle information stored by said first storage means, as valid information, when at least one of the determined dimensions of the adjacent sides is equal to or greater than a predetermined value;

eliminating means for eliminating the rectangle information stored by said first storage means, as invalid information, when both the dimensions of the adjacent sides are smaller than the predetermined value;

processing means for processing the image data generated by said scanning means on the basis of the rectangle information stored as valid information by said second storage means; and printing means for printing the image data processed by said processing means.

* * * * *